Nov. 7, 1939.   R. M. JETT ET AL   2,178,859
POWER TRANSMISSION MECHANISM
Filed June 25, 1937   4 Sheets-Sheet 1

Fig. 1.

Patented Nov. 7, 1939

2,178,859

UNITED STATES PATENT OFFICE 2,178,859

POWER TRANSMISSION MECHANISM

Robert M. Jett and George C. Jett,
Milwaukee, Wis.

Application June 25, 1937, Serial No. 150,272

14 Claims. (Cl. 74—284)

This invention relates in general to power transmission mechanisms and more particularly to that type in which the driven shaft is driven at a reduced speed relatively to the driving shaft, and both the speed and direction of rotation of the driven shaft are capable of being varied relatively to the unidirectional constant speed drive shaft.

Variable speed transmissions of the selective type, such as are commonly employed in automobiles, tractors and the like, are limited in their capabilities by reason of the fact that the shift from one speed to another cannot be accomplished while the power is on. In other words, a shift from one speed to another necessitates that the power delivery be temporarily disrupted by throwing out a clutch, or otherwise, while the shift is being made. In uses where a dead load is continuously imposed upon the driven shaft, such, for instance, as when a tractor is used for plowing, the disconnection of the power to enable the shifting of gears permits the tractor to come to a standstill, with the result that when the power is again applied after the shift the tractor and plows must be put in motion from a dead start. The power required for making such a start is very high and the strains imposed upon the various parts are very heavy, resulting in some instances in breakage and, in any event, in excessive wear and strain of the parts. Furthermore, this type of transmission affords only a very limited number of speed changes between the driving and driven shafts.

One of the features of our present invention resides in the fact that the driving power is never disconnected from the driven shaft, but, on the contrary, the driving and driven shafts remain constantly connected while infinitely variable speed changes within the range of the design are brought about. This feature is of significant importance in the transmission of power in tractors and for many other uses.

We are aware that variable speed transmissions have been rather extensively employed which, by the employment of friction drives, obviate the necessity of disconnecting the power when shifting from one speed to another. Such friction transmissions customarily consist of friction discs cooperating with friction rollers or balls which are adjustable radially of the discs to vary the speed transmitted or they embody tapered rollers in conjunction with an adjustable friction ring by which the same result is accomplished. In all devices of this general character, however, the friction elements, of whatever type, carry all of the power transmitted. The adjustment between the frictional driving parts being a matter of great delicacy and accuracy and being materially affected by wear of the parts, and even under theoretically ideal conditions the amount of power that can be thus frictionally transmitted without undue slippage is very limited, the practical result is that frictional drives of this character are necessarily confined to low power transmission. In fact, so far as we are aware, transmissions of this type are restricted to the transmission of a maximum of about seven horse-power. Our present invention, however, is not so limited, because a large proportion of the transmitted power passes directly from the drive to the driven shaft through toothed gears which are not subject to slippage and only a portion of the transmitted power is circuited through the friction drive. Our invention consequently is capable of employment for the transmission of much heavier power than has heretofore been possible where infinite speed variations between predetermined limits is required.

Our invention possesses the desirable advantage also that it gives a wide range of speed to the driven shaft and provides for infinite increments of speed variation of the driven shaft within that range. For instance, in the particular design herein illustrated as exemplifying the principles of our invention the power from a continuously operating drive shaft rotating at 1200 R. P. M. is transmitted to the driven shaft which, by means of our invention, may be driven at will at any speed or incremental variation thereof between zero and 450 R. P. M. in one direction and between zero and 200 R. P. M. in the reverse direction. The transmission of heavy power through such a wide range of infinitely variable speeds has not to our knowledge been accomplished prior to our invention.

While the design herein disclosed as illustrative of the principles of our invention provides for two directional rotations of the driven shaft, it may be adapted for a unidirectional rotation only of the driven shaft by a simple change of gear ratios, thereby enabling a still greater proportion of the transmitted power to be transmitted directly through toothed gears from the driving to the driven shaft and leaving only a relatively small proportion of the total power to be circuited through the variable speed transforming unit.

Various other advantageous features of our invention and its superiority in accomplishments will become manifest as the invention is better understood by reference to the following description when considered in connection with the accompanying drawings.

Referring to the drawings.

Figure 1:
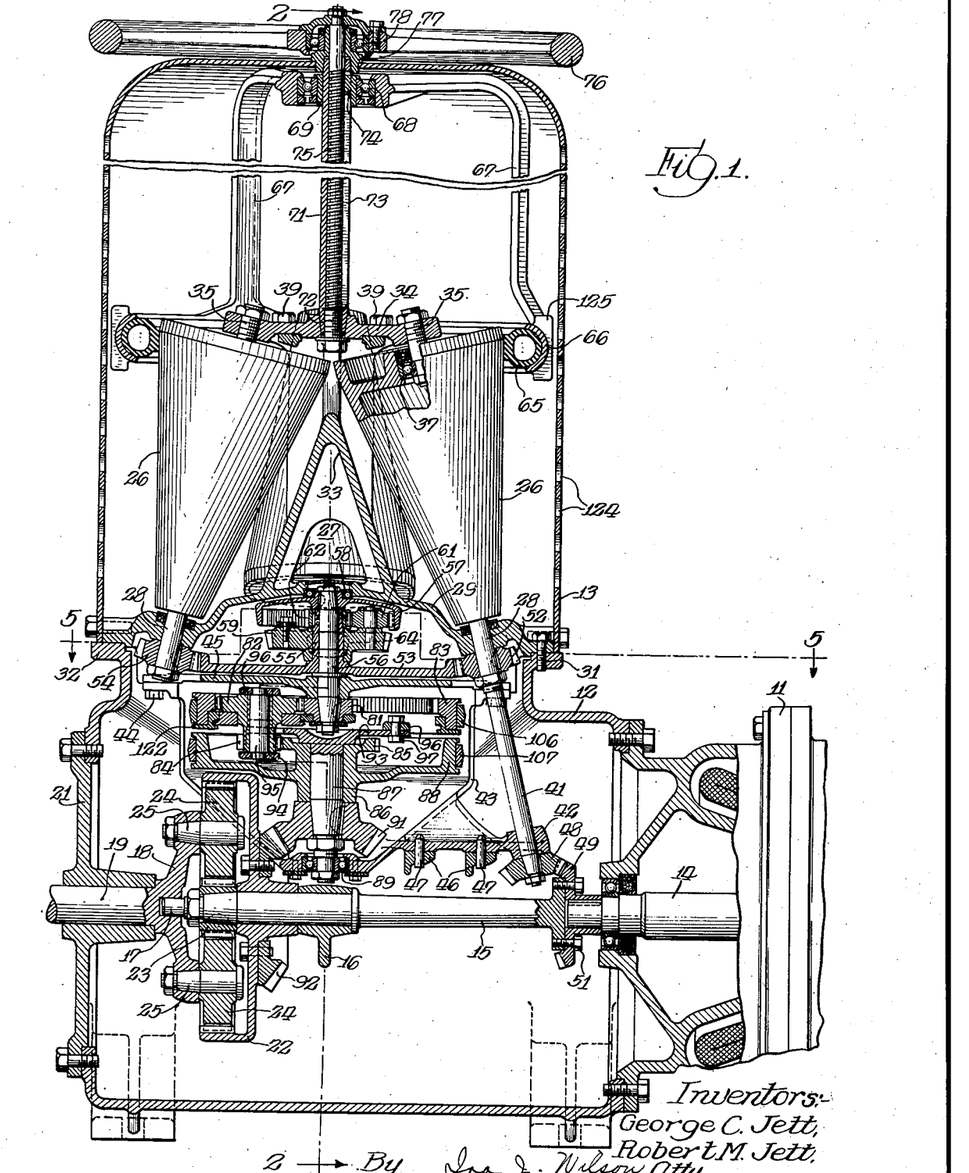
Fig. 1 is a vertical sectional view through a transmission mechanism embodying the principles of our invention.
Figure 2:
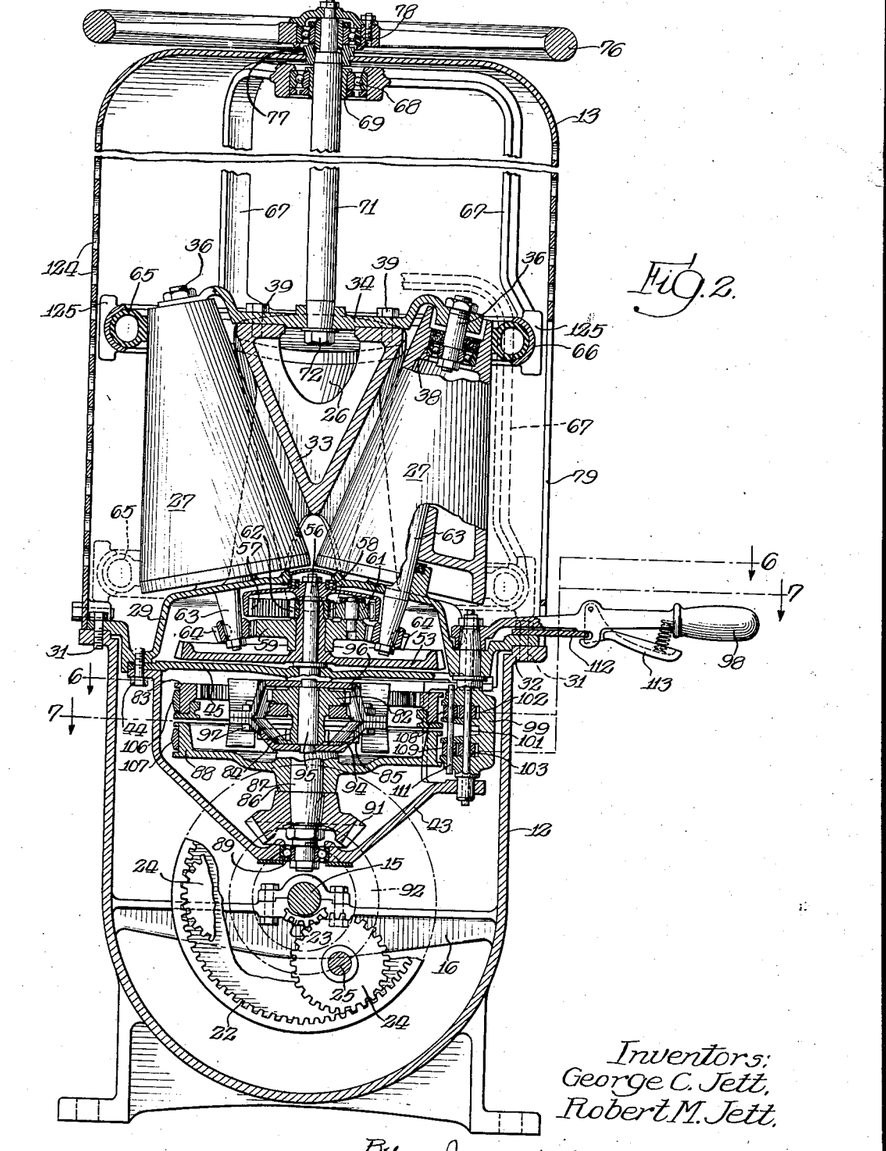
Fig. 2 is a transverse sectional view taken on the line 2—2 of Fig. 1, but also locates the position of the main planetary unit which, viewing Fig. 1, lies to the left of the section line.
Figure 3:
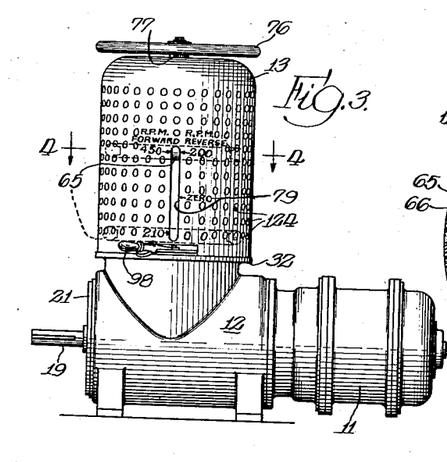
Fig. 3 is a side elevation on a small scale of the motor and transmission unit.

Referring now to the drawings more in detail and particularly to Figs. 1 to 3, inclusive, it will be apparent that the assembly shown for illustrative purposes comprises a motor 11 and a transmission housing 12 surmounted by the perforated casing 13. The motor shaft 14 is coupled to the power or driving shaft 15 which is journaled in a bracket 16, the outer end 17 of this shaft having a bearing in the spider 18 carried by a driven shaft 19 which in turn is journaled in a bearing formed on the removable cap 21 of the housing 12.

The driving shaft 15 and the driven shaft 19 are connected through what will be known as the main planetary unit comprising the internal gear 22 rotatably supported upon the shaft 15, the sun gear 23 fixed to the shaft 15, and a plurality of (in the present instance three) planet pinions 24 journaled upon suitable shafts 25 carried by the driven spider 18. Power is, therefore, transmitted through this planetary unit from the driving shaft 15 directly to the driven shaft 19, the speed and direction of rotation of the driven shaft being determined by the speed and direction of rotation of the internal gear 22. In operation, the gear 22 whether driven forward or backward or held stationary serves as one of the driving elements of the main planetary. The mechanism by which the speed and directional rotation of this internal gear are controlled, to impart to the driven shaft the direction of rotation and the variation in speed desired, comprises a variable speed transforming unit and a plurality of planetary units in conjunction with adjusting or regulating apparatus, all of which will be hereinafter fully described.

Figure 4:
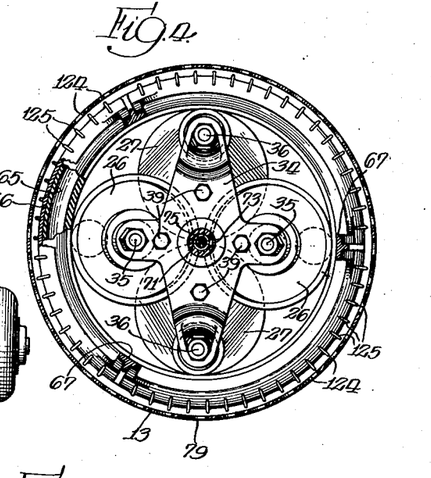
Fig. 4 is a sectional view on the line 4—4 of Fig. 3.
Figure 5:
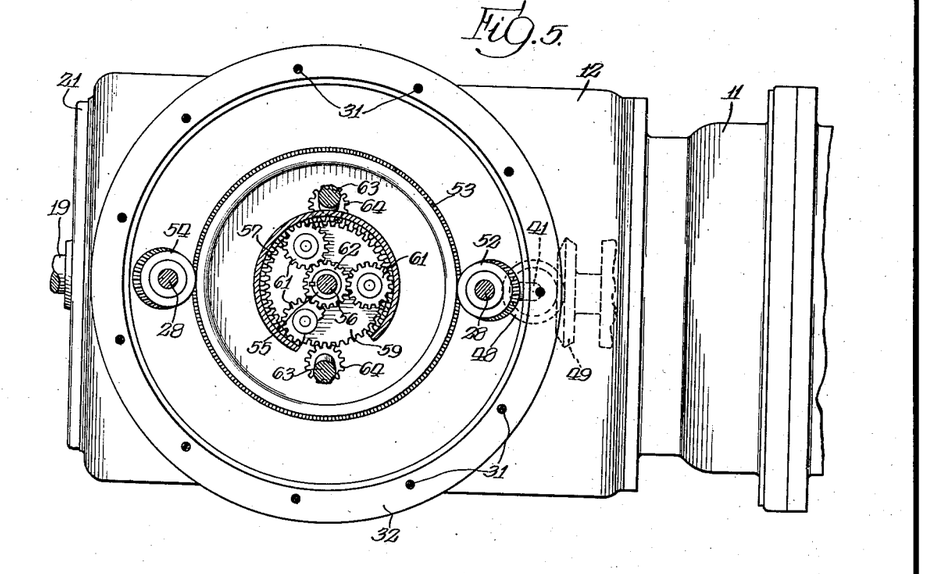
Fig. 5 is a sectional view on the line 5—5 of Fig. 1.

The variable speed transforming unit comprises a plurality of (in the present instance two) driving rollers 26 and an unequal number of driven rollers 27. All of these rollers are frustro conical in form, the driving rollers being positioned with their larger ends uppermost and the driven rollers being positioned with their smaller ends uppermost. The axes of the rollers are inclined, as will be apparent from Figs. 1 and 2, so that the outermost edges of all of the rollers are vertically disposed and positioned on radii of equal length emanating from a common center, the projecting lower portions 28 of the driving roller shafts being journaled in suitable bearings carried by the inverted dished frame plate 29 secured at its perimeter by bolts 31 to the top flange 32 of the casing 12. From this plate rises a standard 33 carrying at its upper end a head 34 shaped as best shown in Fig. 4 to provide supports for the centering studs 35 of the driving rollers and similar studs 36 of the driven rollers, the upper ends of the driving rollers being rotatably mounted on studs 35 through the intermediary of the ball bearings 37, and the driven rollers being similarly mounted on the studs 36 through the intermediary of the ball bearings 38. Bolts 39 secure the head 34 to the upper end of the standard 33.

The shaft 28 of one of the driving rollers has an extension 41 (Fig. 1) journaled at its lower end in a bracket 42 carried by the open housing 43 which is supported at its upper end from the dished plate 29 by bolts 44. A plate 45 providing a bearing, for purposes which will later be apparent, is secured between the housing 43 and the plate 29 by the same fastening bolts 44, as will be apparent from Figs. 1 and 2.

To insure accurate positioning of the bracket 42 within the casing 12, the casing is provided with a pair of cross-bars 46 equipped with dowel pins 47 which, when bracket 42 is accurately positioned, enter openings in the bracket spaced to receive the same, whereby the bracket is positioned and supported.

The lower end of shaft 41 carries a bevel pinion 48 which meshes with and is driven by a bevel pinion 49 keyed to the end of the motor shaft 14 and connected by bolts 51 with the drive shaft 15.

A pinion 52 fixed to the upper portion of shaft 41 meshes with and drives a gear 53 which in turn through a pinion 54 drives the other driving roll 26. The gear 53 is provided with an upstanding hub or sleeve 55 which is journaled upon a vertical shaft 56 supported by the transverse plate 45 and carries at its upper end an internal gear 57, this gear and the shaft 56 being rotatably guided in bearings 58 carried by the inverted plate 29. A beveled gear 59 journaled upon the upstanding hub 55 carries a plurality of (in the present instance three) planet pinions 61 meshing with the internal gear 57 and with a sun pinion 62 fixed on the hub 55 above the gear 59.

The lower end of each driven roll shaft 63 carries a pinion 64 meshing with the beveled gear 59, whereby a driving connection is established between the driving rolls 26 and the driven rolls 27 through the planetary transmission carried by the shaft 56. This planetary connection serves, not to drive one set of rolls from the other but, as a synchronizing mechanism through which the speed of the internal gear 22 of the main planetary transmission mechanism is controlled and regulated through the medium of other mechanism to be later described.

The driven rolls 27 are driven from the driving rolls 26 through the intermediary of a circular driving element frictionally engaging a segment of the perimeter of each of the driving and driven rolls. While the driving element may be made of any suitable material possessing any desired degree of resiliency, and for some purposes it might even be made of steel, we have herein shown a driving element of a pneumatic type, indicated generally by reference character 65. This element resembles in construction a pneumatic tire, except that the tread in this instance, instead of being disposed on the outer perimeter of the tire, is formed on the inner perimeter to frictionally contact the opposed surfaces of the driving and driven rolls. The pneumatic element is mounted in a surrounding rim or carrier 66 which is supported by the arms 67 of an open frame which in turn is rotatably carried by a ball bearing assembly 68 carried by a sleeve 69 which is slidable longitudinally of a guide tube 71 anchored at its lower end by means of a bolt 72 in the head 34. This tube is longitudinally slotted at one side, as indicated at 73, to accommodate a segmental nut 74 fixed to the sleeve 69 and this nut threadedly engages a screw threaded rod 75 housed within the tube 71. To the upper end of this rod there is removably attached a handwheel 76 by which the rod may be rotated to raise and lower the open frame through the instrumentality of the segmental nut 74. For purposes of easy removal of the casing 13, a sleeve 77 is fixed therein and provided with a tapered socket to receive the upper end of tube 71, and between this sleeve and the internal walls of the hub of the handwheel a ball bearing assembly 78 is interposed.

In Figs. 1 and 2 the driving element 65 is shown in its upper position and in Fig. 2 it is shown in dotted lines in its lowermost adjusted position. By manipulation of the handwheel the driving element may be adjusted to any intermediate position between the two extremes illustrated and by means of such adjustment the speed of the driven rolls relatively to that of the driving rolls may be regulated to a fine degree of nicety. For instance, when the driving element is in its uppermost position engaging the rolls 26 at their largest diameters, the driving element will be caused to revolve around the rolls at maximum speed and, at the same time, being engaged with the driven rolls at their smallest diameters these rolls will be driven at maximum speed. At the other extreme position of the driving element illustrated in dotted lines in Fig. 2, the element engaging the driving rolls at their smallest diameters will be driven at minimum speed and, since it at the same time engages the driven rolls on their greatest diameters, these rolls will be in turn driven at minimum speed. It will be apparent, therefore, that, with the driving rolls rotating at a constant speed, a wide variation in the speed of rotation of the beveled gear 59 driven by the driven rolls 27 may be attained by adjusting the driving element 65 to infinitely variable position within the limits of its adjustability. The mechanism comprising the driving and driven rolls and the adjustable driving element constitutes an infinitely variable speed transforming unit which is most suitably adapted for combination in our novel transmission mechanism.

It should be understood, however, that variable speed transforming units of other types than that herein illustrated might be employed in this combination with considerable degree of success. No claim is herein made to the construction of the infinitely variable speed transforming unit illustrated and above described, as this unit per se is the sole invention of George C. Jett and will form the subject matter of a separate application.

While the operation of the mechanism thus far described has been explained to some extent in connection with the foregoing description, a better understanding of the functions of the mechanisms to be hereinafter described may be facilitated by a resumé of the operations of the mechanisms thus far described.

Power from the drive shaft is transmitted through shaft 41 directly to one of the driving rollers and through pinion 52, gear 53, and pinion 54 to the other driving roller 26. These rollers in contact with the driving element 65 cause this element to revolve about its supporting bearings 68, thereby driving the driven rollers 27 which, through the pinions 64, drive the bevel gear spider 59 carrying the planet pinions 61 which mesh with the sun pinion 62 fixed on the hub 55 of gear 53 and also with the internal gear 57 fixed to the upper end of shaft 56.

The bevel gear 59 constitutes a spider for a planetary mechanism comprising the planet pinions 61, sun pinion 62 and internal gear 57, all of which revolve about the driven outlet shaft 56. This planetary mechanism will be referred to as the synchronizing planetary mechanism has one driven member and two independent driving members. The shaft 56 is the driven member and has fixed to its lower end a sun pinion which is in turn a driving member common to the two units of a double planetary mechanism, to be later described. The sun pinion 62 constitutes one of the driving members and, being driven at a constant speed, tends to drive the internal gear 57 at a reduced constant speed in the opposite direction. The spider or gear 59 constitutes the other driving member which tends to drive the internal gear 57 in the same direction as that of the sun pinion 62 but many times faster than the sun gear when the driving element 65 is in its top speed or uppermost adjusted position. Downward adjustment of driving element 65 will decrease the speed of internal gear 57 until, when in its lowest position as shown in dotted lines on Fig. 2, the speed of spider gear 59 carrying planet pinions 61 bears such relation to the speed of sun gear 62 that the driving effects of these gears upon internal gear 57 are exactly neutralized so that the planet pinions revolve and rotate within the internal gear which remains stationary. The shaft 56 is consequently held stationary while under its full torque load. At this time the planetary mechanism is said to be synchronized at zero revolutions of shaft 56. Since extreme accuracy of adjustment of driving element 65 is necessary to obtain exact synchronization of the planetary unit and absolute immobility of shaft 56, it is sufficient for all practical purposes that substantial synchronization and substantial immobility of shaft 56 be attained. This shaft being connected through a gear train (which will be later described) with the internal gear 22 of the main planetary unit, this gear will consequently be held stationary and substantially the entire power output of the drive shaft 15 will be transmitted through the sun pinion 23 and the planet pinions 24 to the driven shaft 19 which will be driven in the same direction as the drive shaft but at an intermediate reduced speed.

If now rotative movement be imparted to the internal gear 22 through its driving control mechanism, the speed and direction of rotation of the driven shaft 19 will be modified in accordance with the rotative movements of the internal gear. For instance, if the internal gear 22 be rotated in the same direction as the driving shaft 15, the speed of the driven shaft will be correspondingly increased. Likewise, if the gear 22 be rotated in the opposite direction, the speed of the driven shaft will be reduced until the linear pitch line speed of gear 22 in one direction is equal to the linear pitch line speed of sun pinion 23 in the opposite direction, at which point the rotation of shaft 19 will become zero, since the planet pinions 24 are under such condition revolving idly on their axes between the oppositely running gears 22 and 23 and the spider 18 carrying the planet pinions remains stationary. If the speed of the internal gear 22 be now increased in a rotational direction opposite to that of driving shaft 15, driven shaft 19 will be rotated in a reverse direction at a speed determined by the difference in the linear pitch line speeds of gears 22 and 23.

The speed of gear 22 is determined by the speed of shaft 56, which, as explained, is dependent on the adjusted position of the driving element 65 on the tapered rollers. The direction of rotation of gear 22 depends on which of two units of a double or multiple planetary mechanism (to be later described) is operatively in gear. If the additive unit is rendered operative, the internal gear 22 will revolve in the same direction as the driving shaft 15, thus adding speed to the driven shaft 19. If, on the other hand, the subtractive unit is rendered operative, the internal gear 22 will revolve in the opposite direction to that of the shaft 15, thus subtracting speed so as to slow down the driven shaft 19. When the driving element 65 is in lowermost or synchronizing position, the internal gear 22 is held stationary and shaft 19 will rotate 210 R. P. M. in the same direction as the rotation of the driving shaft 15, or "forward," as marked on the inspection slot 79 of the perforated casing 13.

The primary purpose of the multiple planetary mechanism is to provide two directional rotations to the shaft 87 (internal gear 22). This feature practically doubles the capacity of the variable speed transforming unit. It uses two complete cycles of the transforming unit. One cycle is operative when geared subtractive. Then one upward adjustment of element 65 to top of the rollers will reduce the speed of shaft 19 from 210 R. P. M. forward to, and through, zero, reversing the direction at about the altitude marked "zero" on the perforated casing 13; then the remaining portion of the adjustment will build up the velocity of shaft 19 from nothing to 200 R. P. M. reverse. At this time the element 65 is at the top of the rollers. A downward adjustment of element 65 will change all the speeds in an exact reverse order and, with element 65 again at the bottom of the rollers, one cycle has been completed. At this position, synchronized, gear ratio changes can be made while the shaft 19 is turning at 210 revolutions under its full torque load.

The next full cycle is operative when the double planetary mechanism is geared additive. Then, an upward adjusting stroke will add to the speed of shaft 19 until at top speed (top of the rollers) 450 R. P. M. will be attained. From that point a downward adjustment to the bottom of the rolls will complete this next cycle.

The multiple planetary mechanism, the purpose of which has just been explained, is incorporated in the driving connection between the shaft 56 and the internal gear 22 of the main planetary unit and comprises the two units which are respectively designated for convenience as the additive unit and the subtractive unit. The additive unit comprises a sun pinion 81 fixed to the lower end of shaft 56 (Figs. 1 and 6) and meshing with a plurality of double planet pinions 82 meshing in turn with an internal ring gear 83 which is in the form of a brake drum adapted to be locked against rotation by a brake, to be later described, or to be freely rotatable when the brake is released.

Figures 6, 7, 9:
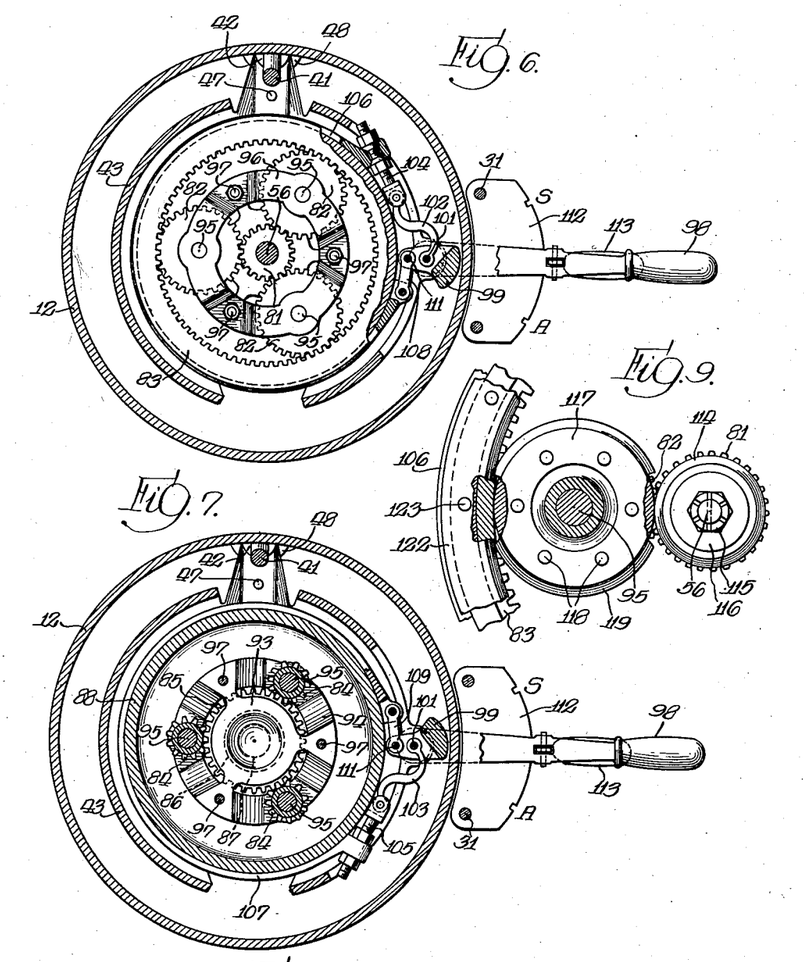
Fig. 6 is a sectional view on the line 6—6 of Fig. 2.
Fig. 7 is a similar view on the line 7—7 of Fig. 2.
Fig. 9 is a fragmentary view of the gearing assembly shown in Fig. 8 viewed on the line 9—9 of Fig. 8.

The subtractive unit comprises the same sun gear 81 and planet pinions 82, the latter of which, as will be apparent from Figs. 1, 2, and 7, are provided with gear portions 84 meshing with a sun gear 85 formed on a hub 86 which is loosely journaled upon a shaft 87 and carries a brake drum 88 disposed beneath and preferably of substantially the same diameter as the ring gear brake drum 83.

The shaft 87 is supported at its lower end by a bearing 89 carried by the casing 43 and has keyed thereto a bevel gear 91 meshing with companion bevel gear 92 fixedly attached to the web of the internal gear 22. The upper end of shaft 87 is provided with a spider 93 overlying the gear 85 and provided with downwardly arched supports 94 each of which supports the lower end of a pintle 95 upon which one of the double planet pinion elements 82—84 is rotatably mounted. The upper ends of these pintles are seated in a ring member 96 shaped to provide alternately arranged elevations to receive the pintle ends and depressions resting upon the spider 93 and rigidly secured thereto by bolts 97, as will be apparent from Figs. 1, 2, and 7. The rotation of shaft 87, which is geared to gear 22, is therefore dependent upon the travel of the planet pinions 82—84 carried by the spider 93 about the common axis of shafts 56 and 87. The direction of rotation of this spider under the action of the planet pinions 82—84 is dependent upon the locking and release of the brake drums 83 and 88. The mechanism for effecting such locking and release is best shown in Figs. 2, 6, and 7, to which reference is now made.

A control lever 98 projecting from the front of the casing is fixedly mounted upon the upper end of a brake actuator 99 journaled in suitable bearings in the housing 43 and in the inverted plate 29. A rod 101 extends coaxially through the actuator and through the eyes of resilient links 102 and 103 attached at their other ends to adjustable bolts 104 and 105 connected respectively with the brake bands 106 and 107 surrounding the brake drums 83 and 88. The opposite ends of the brake drums are respectively connected by linkages 108 and 109 with a pin 111 anchored in the actuator. When the lever is in the position shown in Figs. 6 and 7 of the drawings, both brake bands are in intermediate position and offer but slight resistance to the rotation of their respective brake drums the resistance, however, being sufficient to hold the full torque of shaft 19 which is then, in the design here disclosed, revolving in the same direction as driving shaft 15 at a speed of 210 R. P. M. A notched sector plate 112 is adapted to be engaged by lever latch 113 to lock the lever in adjusted position. When the lever is swung in a clockwise direction viewing Figs. 6 and 7 to bring the latch into cooperative relation with the additive notch A, brake 107 will be released and brake 106 will be applied. When the lever is swung in the opposite direction to bring the latch into cooperative relation with the notch S, brake 106 will be released and brake 107 applied. The nuts on the adjusting bolts 104 and 105 afford provision for the adjustment of the brakes and the resilient S-shaped links 102 and 103 provide for a slight yield of the brakes as a whole under the tension exerted by the links 108 and 109 when the respective brakes are applied. The effect upon the transmission of the application of the respective brakes will be considered hereafter in connection with the operation of the apparatus, but before taking up that phase of the invention it is desired to direct attention to the manner in which the upper end of shaft 87 is held in the assembly against lateral displacement.

Figure 8:
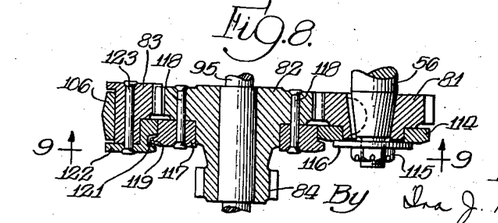
Fig. 8 is a fragmentary sectional view on an enlarged scale of a portion of the gearing and bearings shown in Fig. 1.

It will be apparent from Fig. 1 that the lower end only of shaft 87 is mounted in a bearing and that no bearing is afforded by the frame or housing of the apparatus for the upper end of this shaft. Referring now to Figs. 8 and 9 in conjunction with Fig. 1, it will be observed that the lower end of shaft 56 is provided beneath the sun pinion 81 with a ring 114 having a diameter equal to the pitch diameter of the pinion, the ring being retained in position by a nut 115 on the end of shaft 56 and holding the ring through an interposed washer 116. Companion rings 117 of the same diameter as the pitch diameter of planet pinions 82 are secured to the lower faces of these pinions by bolts or rivets 118 and contact the ring 114 on the common pitch line of pinion 81 and planet pinions 82. The ring 117 is provided with a peripheral tongue or flange 119 loosely entering a companion groove 121 in a ring 122 secured by rivets 123, or otherwise, to the lower face of the internal gear and brake drum 83, the contact line between the rings 117 and 122 being on the common pitch line of internal gear 83 and planet pinions 82. It will be apparent therefore, that the three planet pinions 82 and the spider 93 rigid with the upper end of shaft 87 are held against transverse movement and in axial alignment with the shaft 56 through the intermediary of the ring 114 and the three surrounding rings 117. It will be observed also that the combined brake drum and internal gear 83 is supported entirely by the ring 117 so as to be freely rotatable when its brake band 106 is released. In this manner a support for the brake drum and internal gear 83 and a bearing for the upper end of shaft 87 are provided through the instrumentality of the rings 114, 117, and 122. These cooperating rings serve the dual function of holding the parts against both radial and axial displacement. The shaft 87 and the brake drum and gear 83 are both held against radial movement, and the otherwise unsupported drum 83 is supported in position and against axial movement by the tapered flanges of the rings which roll in the mating tapered grooves of the companion rings. The mean diameter of the tapered groove in each instance is substantially equal to the diameter of the rolling surface of the ring in which such groove is formed.

The frictional driving contact between the driving element 65 and the driving and driven rolls 26 and 27 will result, of course, in the generation of some heat in the driving element. To assist in the dissipation of the heat thus generated, the casing 13 is provided throughout its major portion with air circulation openings 124, and to induce a positive air circulation within the casing the supporting rim 66 of the driving element is preferably provided with vanes or blades 125 so shaped as to induce an outward circulation of air around the driving element. If necessary, other expedient provisions for cooling, such as a fan blower, might be employed in some instances.

*Operation*

It has previously been explained that the infinitely variable speed transforming unit, comprising the tapered friction driving and driven rolls and the synchronizing planetary unit located between the bearing plates 29 and 45, is adapted to rotate the shaft 56 at infinitely variable speeds in one direction or to retain the shaft stationary without rotation, dependent upon the vertically adjusted position of the frictional driving element 65 with respect to the driving and driven rollers 26 and 27. The parts are so designed and proportioned that when the driving element 65 is in the lowermost adjusted position shown in dotted lines in Fig. 2, the pitch line speed of planet pinions 61 driven by gear 53 through the intermediary of sun gear 62 is neutralized in its driving effect upon internal gear 57 by the angular speed of spider gear 59 which carries the pinions bodily with it. The pinions consequently will impart no movement to internal gear 57 but will revolve idly within it, and this gear and its driven shaft 56 will remain substantially motionless under the influence of its opposed substantially synchronized and balanced driving gear trains.

In this position of adjustment the driving effect in one direction of the friction rolls is neutralized by the driving effect in the opposite direction of the gear 53. Sun gear 81, therefore, is held stationary and all geared connections between this sun gear and the internal gear 22 of the main planetary are held stationary, with the result that all of the power of the driving shaft is transmitted through the planet pinions 24 directly to the driven shaft 19 which, under this direct drive, is driven in a forward direction or the same direction as driving shaft 15 is rotating at a speed of 210 R. P. M. when the driving shaft is rotating at 1200 R. P. M. In this position of adjustment either one or both of the brakes 106 and 107 may be applied, and gear 22 is held against considerable torque stress while the power is transmitted directly from the driving to the driven shaft at the relative speeds above indicated. This direct drive position of adjustment in which the entire train of geared mechanisms between gear 22 and shaft 56 remain idle is the point at which all gear ratio changes are made while driven shaft 19 is revolving and under load and provides for a reversal of directional rotation of gear 22 under full torque load and without clash of teeth or injury to the mechanism.

Assuming now that a higher forward speed of shaft 19 is desired, brake lever 98 is adjusted in a clockwise direction viewing Figs. 6 and 7 to the additive side of the sector 112 indicated by "A," thus applying brake 106 and releasing brake 107. Upward adjustment of friction driving element 65 will increase the speed of gear 59, thereby causing internal gear 57 and shaft 56 to be rotated, and likewise sun gear 81 carried by shaft 56, so that this gear acting upon planet pinions 82 will cause the shaft 87 (by which they are carried) to revolve and, through beveled gears 91 and 92, drive gear 22 in the same direction as driving shaft 15, thereby increasing the forward speed of shaft 19. Continued adjustment of the driving element 65 upwardly steps up the speed of gear 22 by incremental increases until, when the driving element is in its uppermost position as shown in full lines in Figs. 1 and 2, an additional 240 R. P. M. has been added to the original 210 R. P. M., giving a total maximum forward speed to the driven shaft 19 of 450 R. P. M.

To obtain speeds of the driven shaft less than

210 R. P. M. forward, the driving element 65 is adjusted to its lowermost position, bringing the control gear train for the gear 22 to rest, whereupon lever 98 is shifted from its additive position, in a counterclockwise direction (viewing Figs. 6 and 7), to its subtractive position indicated by S, thereby releasing brake 106 and applying brake 107. In this position of the parts shaft 19 will still be driven 210 R. P. M. forward, since gear 22 and the entire control train up to and including internal gear 57 will remain stationary.

If we now adjust driving element 65 upwardly, thereby imparting rotation to sun gear 81, the double planet pinions 82—84 will be caused to revolve. The internal gear and brake drum 83, being now freed by its brake 106, will spin idly on its supporting ring 122, but external gear 85 being locked through its brake drum 88 and applied brake 107 will cause the planet pinions 82—84 and the spider 93 by which they are carried to travel around the gear 85 in a reverse direction, thereby through beveled gears 91 and 92 imparting a reverse movement to gear 22. This reverse movement of gear 22 will reduce the driven speed of spider 18 and shaft 19 until, when the driving element 65 has been adjusted upwardly to the intermediate point marked "zero" (Fig. 3), shaft 19 will stand motionless while all of the gear trains and driving mechanism remain in operation.

Further upward adjustment of driving element 65 will increase the reverse speed of gear 22 until, when element 65 has been moved to its upper limit of adjustment, shaft 19 will be driven in a direction reverse to that of drive shaft 15 at a maximum reverse speed of 200 R. P. M. For the purposes of the disclosure in this application the forward speeds of shafts 15 and 19 may be considered as a counter-clockwise rotation of shaft 15 (viewing Fig. 2) and reverse of shaft 19 as being in the opposite rotational direction.

It will be apparent, therefore, that our invention provides for a continuous delivery of power from the driving to the driven shaft, and that when the auxiliary mechanism is adjusted to synchronized position to retain the gear 22 at rest, all of the power of the driving shaft will be transmitted to the driven shaft through the main planetary unit to drive the driven shaft in a forward direction at 210 R. P. M. In this position of adjustment in which the control gear trains are all stationary, the brake lever may be manipulated to render either the additive or the subtractive portion of the double planetary unit operative and the other portion inoperative. If the additive portion be rendered operative, the speed of the driven shaft may be increased from 210 R. P. M. to 450 R. P. M. by upward adjustment of the driving element 65 to its upper limit. The gradations between 210 R. P. M. and 450 R. P. M. are accomplished through incremental variations without shock or jar or the imposition of excessive strains upon the parts. From the 210 R. P. M. position forward the speed of the driven shaft may be varied in the opposite direction by manipulating the brake lever to release the additive portion of the double planetary and lock the brake drum of the subtractive portion. Upward adjustment of the element 65 now gradually increases the speed of gear 22 in the opposite direction, thereby reducing the speed of driven shaft 19 to and through zero and beyond to a minus speed or reverse speed of 200 R. P. M. when driving element 65 is located in its uppermost position of adjustment. The speed decreases and the reverse speed increases are, similarly to the increases in forward speed, accomplished by incremental variations resulting from the adjustment of the friction drive element 65, so that in all speed changes from maximum reverse to maximum forward provision for infinitely variable speeds within the predetermined range of the mechanism is made.

Since at some speeds practically all of the power is delivered directly from the driving to the driven shaft and at all speeds a large proportion of the power is thus directly transmitted, it should be manifest that a transmission mechanism embodying the principles of our invention is capable of employment for the delivery of much greater power than it has heretofore been possible to transmit through frictional transmissions in which all of the power has been transmitted through a frictional drive.

Our invention is also well suited for embodiment in heavy duty transmissions where unidirectional rotation only of the driven shaft is desired. In such installations infinitely variable speeds within predetermined limits and above zero rotation of the driven shaft are possible of attainment with our invention, the major portion of the power being in such cases transmitted directly and only a small portion being shunted through our variable speed assembly.

While we have shown and described that embodiment of our invention which at present seems preferable, it should be understood that the structural details illustrated and described have been selected merely to exemplify the principles of our invention and that such details are capable of wide variation and modification without departing from the scope of our invention as defined in the following claims.

We claim:

1. In a power transmission mechanism, the combination of a housing provided with an open top and a removable end, a driven shaft journaled in said removable end, a driving shaft in said housing aligned with said driven shaft, a planetary unit interposed between said driving and driven shafts, the planetary pinions of said unit being carried by the driven shaft and removable from the housing with said driven shaft by removal of said housing end, an open casing insertable into said housing through the open top thereof, supporting means provided with dowel pins for positioning and supporting said casing, mechanism mounted within said casing in position to cooperate with said planetary unit when the casing is properly positioned within the housing, and means for controlling and actuating said mechanism.

2. In a transmission mechanism, the combination of a housing having an open top and an open end, a driving shaft mounted within the housing, a closure for said open end, a driven shaft journaled within said closure and carrying a plurality of planet pinions, a sun gear mounted on said driving shaft and meshing with said pinions, a rotatable gear mounted on the driving shaft, said driven shaft being removable from the housing with said closure, a casing insertable and removable through the open top of said housing, stationary means within the housing for centering and supporting the lower end of the casing, means for centering and supporting the upper end of said casing, mechanism carried by said casing in position to cooperatively engage said rotatable gear when the casing is properly positioned within the housing, and means removably supported by the housing above said casing for actuating said mechanism carried by the casing at infinitely variable speeds whereby the speed and direction of rotation of said driven shaft is controlled.

3. A transmission mechanism of the type comprising a driving shaft, a driven shaft and a planetary unit connecting said shafts and including a freely rotatable gear meshing with the planet pinions of said unit, characterized by a control apparatus for controlling said gear to cause the driven shaft to be driven from the driving shaft at infinitely variable speeds throughout a predetermined speed range, said apparatus including a pair of planetary units comprising a common sun gear, common planet pinions and gears meshing with said pinions, manually controlled means for locking and releasing said last mentioned gears in predetermined order, and means for driving said sun gear at infinitely variable speeds, said last mentioned means comprising a power actuated manually controlled continuously operating variable speed transforming unit having a delivery element and a synchronizing mechanism interposed between said unit and said sun gear for driving said sun gear or holding the same stationary under torque dependent upon the rotative speed of the delivery element of said unit.

4. In a power transmission mechanism of the type comprising a driving shaft, a driven shaft, and a planetary unit connecting said shafts and including a freely rotatable gear, an apparatus for so controlling said gear as to cause the actuation of the driven shaft from the driving shaft at infinitely variable speeds, said aparatus including a power actuated manually controlled infinitely variable speed friction drive unit, a synchronizing mechanism for converting the lowest speed of said unit into zero revolutions of the power output shaft of said mechanism, and driving and control means interposed between said power output shaft and said gear, said last mentioned means including a double planetary unit having a common sun gear and common planet pinions, one planetary unit comprising an internal gear meshing with said pinions and the other planetary unit comprising an external gear meshing with said pinions, said internal and external gears being each equipped with a rotatable brake drum, a brake for each of said drums, and control means whereby said brakes may be applied and released in predetermined order only to change the direction of rotation of said freely rotatable gear while maintaining said gear under continuous torque.

5. A transmission mechanism of the type including a driving shaft, a driven shaft, a planetary unit interposed between said shafts, one gear of said unit being fixed to the driving shaft and the other gear thereof being freely rotatable relatively to the driving shaft and being controllable both as to speed and direction of rotation, characterized by means for controlling said gear, which includes a double planetary unit having the spider thereof connected to said controlled gear, a plurality of planet pinions carried by said spider, a common sun gear meshing with said pinions, an external gear meshing with said pinions and provided with a brake drum, an internal gear meshing with said pinions and provided with a brake drum, adjustable brake means for locking and releasing said drums in predetermined order, and controllable means for actuating said sun gear, said controllable means including a power actuated manually adjustable infinitely variable speed transforming unit and a synchronizing mechanism for rotating said sun gear or holding the same stationary at will.

6. Mechanism for selectively holding the controllable driving element of a power transmitting planetary gearing stationary or revolving the same in forward or reverse directions, comprising a multiple planetary unit including a sun gear, an external gear, an internal gear, brakes for said external and internal gear, a plurality of planet pinions meshing with said gears and a single manually operable means for operating said brakes whereby said internal and external gears may be locked and released in predetermined order when said sun gear is stationary, and continuously operated variable speed mechanism for selectively rotating said sun gear at zero or greater R. P. M. at will, whereby said controllable driving element may be caused to be rotated at variable speeds in either direction.

7. In a mechanism for controlling a controlled driving element of a power transmitting unit, the combination of a variable speed transforming mechanism, a synchronizing planetary unit comprising a driven element and two driving elements, one of said driving elements being continuously operated at a constant speed and the other being continuously operated from said transforming mechanism at a variable speed, said driving elements being adapted to jointly produce zero revolutions of said driven element, a multiple planetary unit operable by the driven element of said synchronizing planetary unit, said multiple planetary unit comprising a driven element, a driving element operable by the driven element of said synchronizing planetary unit, a plurality of progressively controllable elements and manually operable means for controlling said last mentioned elements whereby one of said last mentioned elements may be cooperatively associated with said planetary driving element to actuate said planetary driven element, and an operative driving connection between the driven element of said multiple planetary unit and the controlled driving element of said power transmitting unit.

8. A mechanism for controlling the controlled element of a planetary transmission apparatus, comprising an auxiliary unit adapted to deliver infinitely variable selected speeds within a predetermined speed and power range, a synchronizing mechanism for converting the slowest delivered speed of said unit into zero revolutions of a driven shaft for gear ratio change purposes, a multiple unit planetary gearing connected with said driven shaft and said controlled element for modifying the speed and direction of rotation delivered by said shaft, and means adapted to be operated when said driven shaft is geared to zero for controlling said multiple unit gearing so that the modification in speed and direction produced by each unit thereof may be individually imposed upon the entire range of speeds delivered by said auxiliary unit, whereby said controlled element may be subjected from zero revolutions to top speed in each direction of rotation to the complete speed range and power capacity of said auxiliary unit.

9. A mechanism for controlling the controlled gear of a power transmitting planetary unit, comprising a continuously operating variable speed transforming unit, synchronizing mechanism including a shaft and means for converting the low speed of said transforming unit into zero revolutions of said shaft to provide a synchronized period for gear ratio changes under full torque load, a gear ratio change mechanism including a plurality of gear elements interposed between said shaft and said controlled gear for transmitting to said controlled gear a plurality of complete speed ranges of said speed transforming unit, and means for holding and releasing said gear elements in predetermined order to thereby modify said transmitted speeds both as to speed and direction of rotation whereby said controlled gear may be driven at infinitely variable speeds in either direction.

10. In a transmission having a controlled driven element adapted to be driven at infinitely variable speeds in both forward and reverse directions, the combination of a continuously operating, infinitely variable speed auxiliary unit, a synchronizing unit so connected thereto and to a source of power that the low speed of the auxiliary unit is converted into zero revolutions of the delivery shaft of the synchronizing unit to thereby provide a synchronized period of zero revolutions for selective gear ratio changes while the transmission is in motion and under load, and a manually controlled gear ratio change mechanism having gear elements between the synchronizing unit and said controlled element and including means for locking and releasing said gear elements of said mechanism in such order as to continuously maintain said controlled element under torque.

11. A mechanism for controlling the controlled gear of a power transmitting planetary unit comprising a continuously operating variable speed auxiliary unit, synchronizing mechanism connected with said unit and with a source of power whereby a predetermined speed of said auxiliary unit is converted into zero revolutions of the delivery shaft of said synchronizing mechanism to provide a synchronized period for selective gear ratio changes, and manually controlled means including toothed gears interposed between said shaft and said controlled gear for changing from one gear ratio to another while the mechanism is under full torque load to thereby modify the speed and direction of rotation delivered to said controlled gear from said shaft and whereby the so modified speed and direction resulting from each gear change may be varied through the entire speed and power range cycle of said auxiliary unit to thereby positively and continuously maintain said controlled gear under the conjoint control of said auxiliary unit and said manually controlled means.

12. In a transmission mechanism of the type comprising a drive shaft, a driven shaft and an interposed planetary unit including a controlled gear, an apparatus for controlling the speed and direction of rotation of said controlled gear, comprising a continuously operating power actuated variable speed transforming unit, a continuously operated synchronizing mechanism including gearing adapted to convert the lowest speed of said variable speed transforming unit into zero revolutions of the power output shaft of the synchronizing mechanism for gear ratio change purposes, and gear ratio change mechanism interposed between said synchronizing mechanism and said controlled gear, comprising a sun gear connected to the power output shaft of said synchronizing mechanism, a spider connected to said controlled gear, a plurality of double pinions carried by said spider and meshing with said sun gear, an internal gear and an external gear meshing with said pinions, brakes for said internal and external gears and a single manually controlled device for operating said brakes to lock and release said internal and external gears in such predetermined order as to continuously maintain the exertion of a torque upon said controlled gear.

13. In a transmission mechanism of the type having a driving shaft, a driven shaft, a planetary unit connecting said shafts and including a controlled gear, the combination of a multiple unit planetary mechanism connected to said controlled gear, manually operable means for influencing the units of said planetary mechanism in predetermined order to hold said controlled gear stationary under torque or to effect gear ratio changes for driving said controlled gear in either direction at will, a continuously operating power driven infinitely variable speed transforming device, and a synchronizing mechanism interposed between said speed transforming device and said multiple unit planetary mechanism adapted to neutralize the speed of the transforming device so as to thereby enable said gear ratio changes to be made without releasing the torque on said controlled gear, the synchronizing mechanism and the multiple unit planetary mechanism being designed and arranged to transmit to the controlled gear in either direction of rotation a complete cycle of the infinitely variable speeds of the transforming device.

14. In a transmission mechanism of the type having a driving shaft, a driven shaft, planetary gearing interposed between said shafts, the planet pinions of said gearing being journaled on a spider fixed to the driven shaft and meshing with two driving gears, one of said driving gears being fixed to said driving shaft and the other driving gear being rotatably mounted thereon to constitute a control gear, the combination of a continuously operating manually adjustable speed transforming mechanism, direction changing gear units connected with said controlled gear, a synchronizing mechanism interposed between said speed transforming mechanism and said gear units and adapted to convert the slowest adjusted speed of said speed transforming mechanism into zero revolutions of the output shaft of the synchronizing mechanism for holding said controlled gear stationary between reversals of direction and enabling a drive change from one of said gear units to another, said synchronizing mechanism and gear units providing a positive and permanent connection between said speed transforming mechanism and said controlled gear, whereby said driven shaft is continuously and positively controlled throughout a continuous but variable speed range including a plurality of complete speed range and power cycles of said speed transforming mechanism.

GEORGE C. JETT.
ROBERT M. JETT.